(12) United States Patent
Intwala (10) Patent No.: US 8,055,101 B2
(45) Date of Patent: Nov. 8, 2011

(54) SUBPIXEL REGISTRATION

(75) Inventor: Chintan Intwala, Santa Clara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 818 days.

(21) Appl. No.: 12/111,919

(22) Filed: Apr. 29, 2008

(65) Prior Publication Data

US 2009/0268984 A1 Oct. 29, 2009

(51) Int. Cl.
*G06K 9/32* (2006.01)
*G09G 5/00* (2006.01)

(52) U.S. Cl. ......................... 382/299; 345/613
(58) Field of Classification Search ............. 382/162, 382/209, 274–275, 294, 299, 305; 348/95; 358/1.2; 345/589, 593, 613, 651
See application file for complete search history.

(56) References Cited

U.S. PATENT DOCUMENTS

| | | | |
|---|---|---|---|
| 5,848,121 A | | 12/1998 | Gupta et al. |
| 6,483,538 B2 | | 11/2002 | Hu |
| 7,106,914 B2 | * | 9/2006 | Tipping et al. ............. 382/299 |
| 7,242,806 B2 | * | 7/2007 | Johnson et al. ............. 382/209 |
| 7,327,871 B2 | | 2/2008 | Ishikawa |
| 7,420,592 B2 | * | 9/2008 | Freeman ................. 348/219.1 |
| 7,602,997 B2 | * | 10/2009 | Young ...................... 382/299 |
| 7,620,269 B1 | * | 11/2009 | Nandy ...................... 382/294 |
| 7,680,303 B2 | * | 3/2010 | Porikli et al. .............. 382/107 |
| 7,916,971 B2 | * | 3/2011 | Bigioi et al. .............. 382/275 |

OTHER PUBLICATIONS

Katsaggelos, A.K. et al. (Aug. 11, 2006). *Super resolution of images and video*. Morgan & Claypool Publishers.

* cited by examiner

*Primary Examiner* — Kanjibhai Patel
(74) *Attorney, Agent, or Firm* — Fish & Richardson P.C.

(57) ABSTRACT

Sub pixel image alignment includes mapping first pixels from a first image and second pixels from a second image to a coordinate system and applying one or more sub-pixel shifts to the mapped first pixels. For each sub-pixel shift, an overall energy is calculated and is based on a plurality of gradients that represent changes in a channel value among the shifted first pixels and the mapped second pixels. The sub-pixel alignment further includes determining the sub-pixel shift that provides the lowest overall energy.

30 Claims, 9 Drawing Sheets

Image 1

Image 2

FIG. 5A

Pixel Registration of Image 1 and Image 2

SUBPIXEL REGISTRATION

BACKGROUND

Robust image registration is one of the problems at the core of research in computer vision and the emerging field of computational photography (CP). Various techniques for robust image registration exist and are based on methods such as aligning features within the image or applying dense pixel-to-pixel correspondence, among others.

A general approach in computational photography is to take multiple pictures of the same scene, each taken in a slightly different way, and then combine the images to produce one single photograph. Some of the goals in producing the final photograph include, for example, refocusing the image in post-processing or increasing the dynamic range of the photograph. In some cases, the goal of CP is to produce a single super-resolution image based on multiple lower resolution images.

Although super-resolution images can be obtained by increasing the resolution of a camera's image sensor, higher resolution sensors also give rise to higher fabrication costs and increased shot noise. Furthermore, increasing the sensor chip size to accommodate a larger number of pixels leads to increases in capacitance, which can reduce the data transfer rate. In addition, the application of pixel level registration among images, during the formation of a super-resolution image, can lead to artifacts such as blurring and the appearance of double features.

SUMMARY

The present disclosure relates to sub-pixel image alignment.

In general, one aspect of the subject matter described in this specification can be embodied in a computer-implemented method that includes mapping first pixels from a first image and second pixels from a second image to a coordinate system, applying one or more sub-pixel shifts to the mapped first pixels, calculating, for each sub-pixel shift, an overall energy based on a plurality of gradients that represent changes in a channel value among the shifted first pixels and the mapped second pixels, and determining the sub-pixel shift that provides the lowest overall energy. Other embodiments of this aspect include corresponding systems and computer program products.

These and other embodiments can optionally include one or more of the following features. The computer-implemented method can also include applying pixel-level alignment to the first image and the second image prior to mapping the first pixels and the second pixels to the coordinate system.

In some implementations, calculating an overall energy can include determining one or more planes from third pixels comprising a plurality of shifted first pixels and mapped second pixels. Vertices of the planes can be coincident with locations of the third pixels in the coordinate system.

In some cases, the channel is one of luminosity, intensity and alpha value.

In certain implementations, the channel corresponds to a dimension in a color space.

Calculating an overall energy can include calculating an energy for each plane based on a change in channel value across the plane. Calculating an energy for each plane can include calculating a gradient for each plane.

In some applications, calculating an overall energy includes summing the energy of each plane.

In some implementations, the computer-implemented method includes refining the one or more sub-pixel shifts, applying the refined one or more sub-pixel shifts to the mapped first pixels, calculating, for each refined sub-pixel shift, a refined overall energy based on a plurality of refined gradients that represent changes in a channel value among the first pixels shifted by the refined sub-pixel shift and the mapped second pixel, and determining the refined sub-pixel shift that provides the lowest refined overall energy.

In certain cases, the one or more sub-pixel shifts are applied to the mapped first pixels over a fixed range.

Particular embodiments of the subject matter described in this specification can be implemented to realize one or more of the following advantages. In some cases, sub-pixel registration can be used to construct a super-resolution image from several lower resolution images. Additionally, the sub-pixel registration can reduce artifacts, such as blurring or double features, that occur in super-resolution images.

In many computer vision problems, it is necessary to determine an amount of shift or motion between pixels, objects, frames or images. However, pixel-level registration is sometimes unable to resolve the shift amount. In contrast, sub-pixel registration may be used to determine and resolve the shifts at acceptable levels of detail.

The details of one or more embodiments of the invention are set forth in the accompanying drawings and the description below. Other features, aspects, and advantages of the invention will become apparent from the description, the drawings, and the claims.

DETAILED DESCRIPTION

The term super-resolution, also known as resolution enhancement, is used to describe the process of obtaining a high resolution image or a sequence of high resolution images from a set of lower resolution images. There are multiple techniques for acquiring low resolution images including, for example, using multiple sensors to image a single scene, using a single sensor that simultaneously captures multiple low resolution images of a scene, or using a single sensor to image a scene over a period of time.

Figure 1:
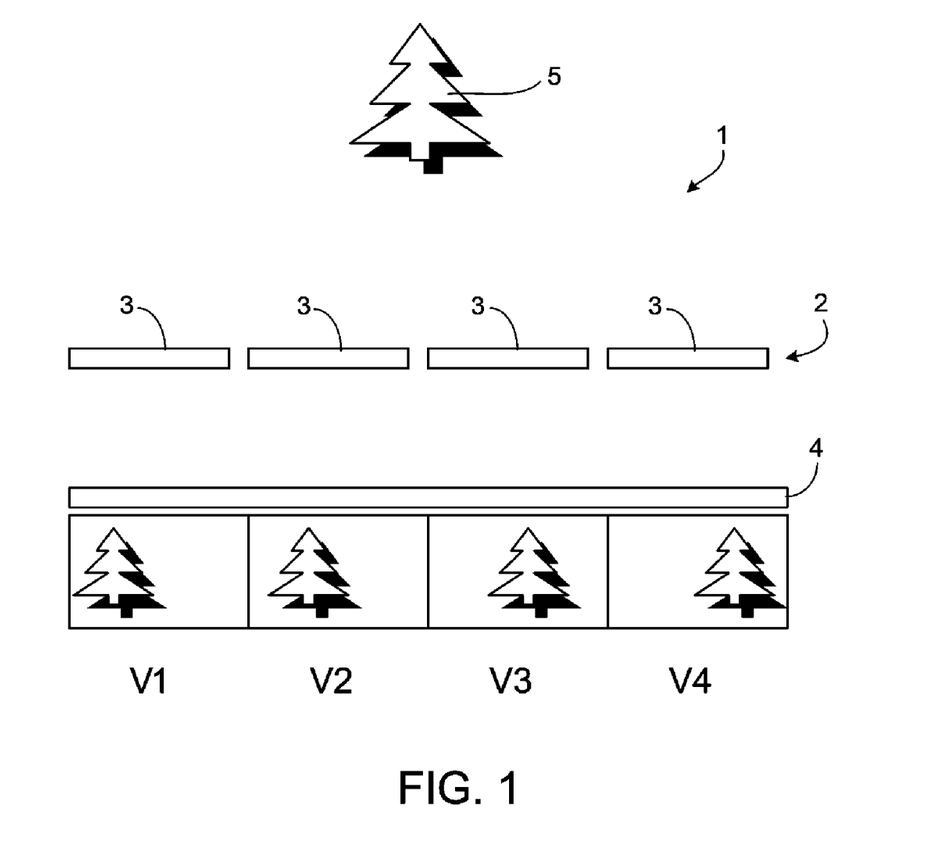
FIG. 1 illustrates an example of a lightfield camera.

A particular type of camera known as a "light-field camera" simultaneously captures multiple shots of the same scene from slightly different viewpoints. An example of a light-field camera 1 is shown in FIG. 1. The camera 1 includes a microlens array 2 composed of multiple microlenses 3 in front of a single image sensor 4. The microlenses 3 are displaced from each other such that each microlens captures a slightly different view of a scene 5 being photographed. The different views V1, V2, V3, V4 are recorded by the image sensor 4. Because of the slight displacement in the position of each microlens, each of the recorded images represents a sub-sampled (aliased) version of the original scene and contains complementary information. With knowledge of the shifts, the recorded images can be combined to remove the aliasing and produce a higher resolution final image of the scene based on the complementary information.

Figure 2:
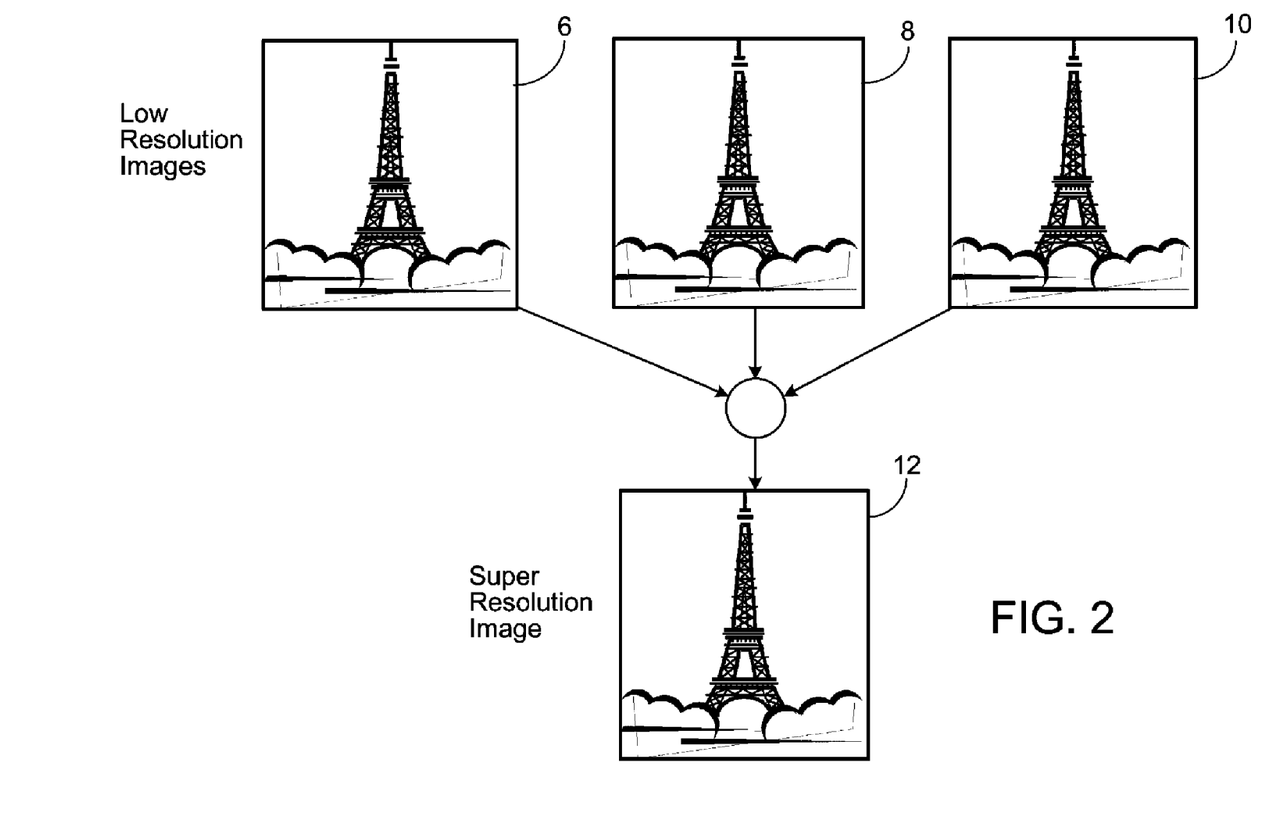
FIG. 2 illustrates examples of low resolution images combined to form a high resolution image.

For example, FIG. 2 shows three separate low-resolution images 6, 8, 10 obtained by a light-field camera of the same scene, i.e., the Eiffel tower as shown in the example. The scene in each image is slightly displaced from the scene in the other two images. Therefore, each low-resolution image can include complementary information that may be combined into a single high-resolution image 12.

Accordingly, to produce the high resolution images, the relative position of the scene in each image should be determined. Based on that positional information, the images can be shifted to align the underlying scenes and compose a high resolution image. However, if alignment of the scenes is performed using only pixel registration among the images, artifacts such as blurring and the appearance of double features can occur. These artifacts arise because the alignment of scenes is limited by the pixel size during pixel registration. A pixel is short for picture element and represents a single point in a graphic image. Digital images can be presented as a collection of pixels arranged together in columns and rows in which the value of a pixel may correspond to an image color space value. Examples of image color spaces include, but are not limited to, color spaces such as CMYK, RGB, HSV, HSL, YPbPr, grayscale, or black and white.

Sub-pixel registration, however, enables a more precise alignment of the scenes. In sub-pixel registration, the images are shifted relative to each other by a sub-pixel distance. Once the optimum relative position of the images is obtained, the complementary scene information from each image is used to construct a super-resolution final image.

Figure 3A:
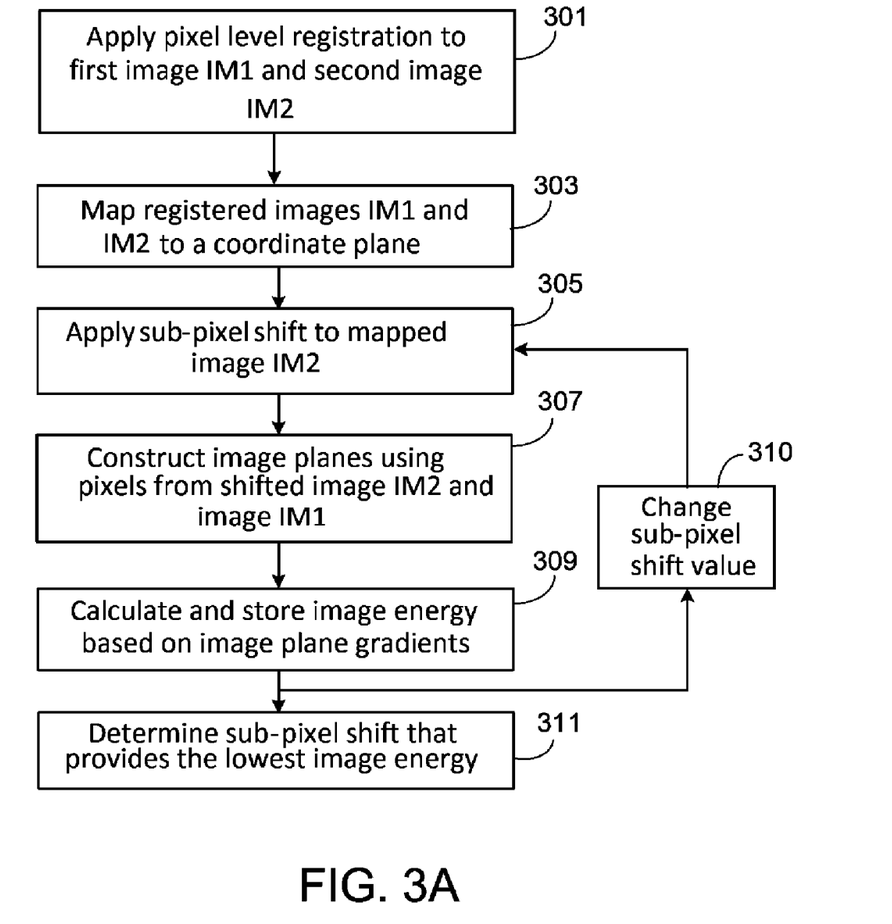
FIG. 3A illustrates an example process flow diagram for applying sub-pixel resolution to images.

An example process for applying sub-pixel registration between two images, $IM_1$ and $IM_2$ is presented in the flow-diagram FIG. 3A. Images $IM_1$ and $IM_2$ include, but are not limited to, images recorded by a device (for example, a light-field camera) and images that are computer generated. Images $IM_1$ and $IM_2$ depict a same or similar scene, in which the position of the scene in $IM_2$ is displaced from the position of the scene in $IM_1$. The images obtained from the device then are provided to a machine or system, such as a computer, capable of modifying and storing the image information. The process includes: applying pixel level registration (301) between image IM1 and IM2; matching the registered images $IM_1$ and $IM_2$ to a coordinate plane (303); applying a sub-pixel shift (305) to image $IM_2$; constructing plane elements using shifted and non-shifted pixels (307); calculating and storing an overall energy based on gradients of the plane elements (309); repeating procedures (305)-(309) for a different sub-pixel shift (310); and determining the sub-pixel shift of $IM_2$ that provides the lowest overall energy (311). The process described in FIG. 3A can be configured to run on a computer system automatically or with the aid of user provided information. Although the process described in FIG. 3A refers only to two images, the sub-pixel registration process can be applied to three or more images, as well. The number of times that procedures (305)-(309) repeat can be limited depending on the size of the sub-pixel shift and the distance over which the sub-pixel shift is applied. Alternatively, a user can define how often procedures (305)-(309) should repeat.

Figure 3B:
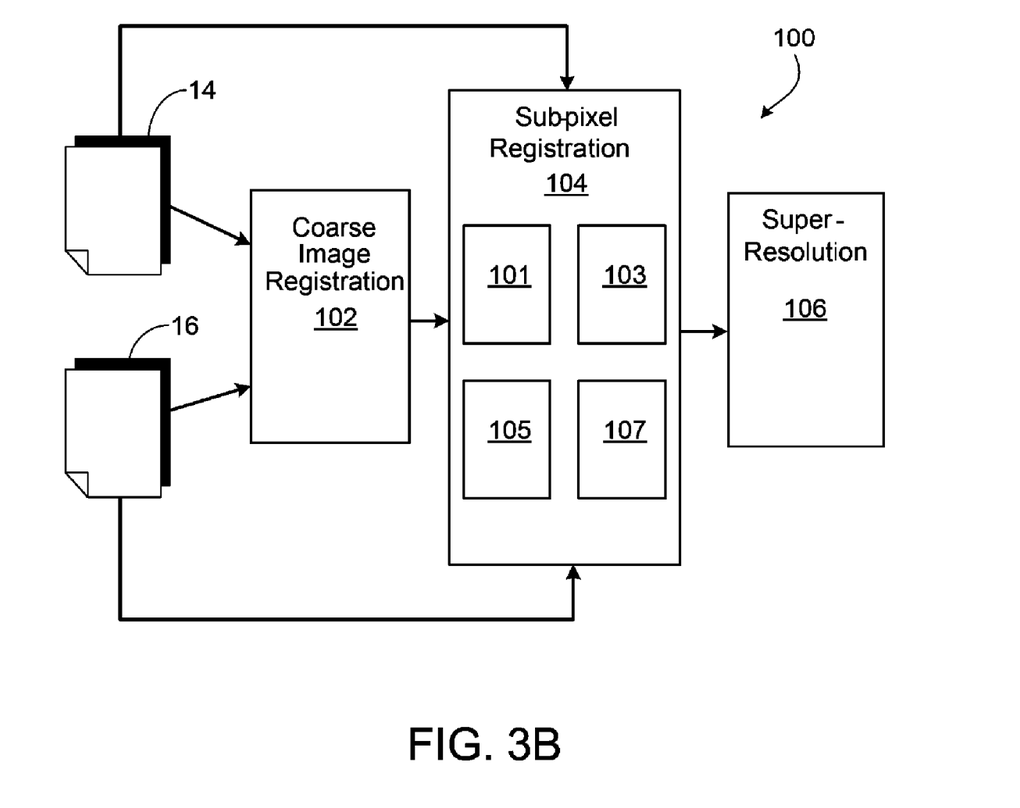
FIG. 3B illustrates a schematic diagram of an example system.

FIG. 3B illustrates a schematic diagram of an example system 100 that can be used to perform the process flow of FIG. 3A. The system 100 includes coarse image registration component 102, sub-pixel registration component 104 and super-resolution component 106. There can be fewer or more components than illustrated. Images 14 and 16 are provided as inputs to the coarse image registration component 102. Although two images are shown, additional images may be provided as inputs to the coarse registration component 102. The images may be provided in digital or analog form over wired or wireless networks. Upon receiving the images 14, 16, the component 102 applies a coarse alignment/registration algorithm. The algorithm produces coarse alignment information which then is provided to the sub-pixel registration component 104.

The sub-pixel registration component 104 receives the coarse alignment information as well as the images 14, 16 and applies sub-pixel registration to the images. The sub-pixel registration component 104 includes several sub-components for applying the sub-pixel registration. The sub-pixel registration component 104 can include fewer or more sub-components than illustrated. The sub-components include: an image mapping component 101 that maps the received images to a coordinate system; a sub-pixel shift component 103 that applies a sub-pixel shift to at least one of the received images; an image plane construction component 105 that constructs plane elements based on shifted and non-shifted pixels; and a calculation component 107 that calculates an overall energy based on gradients of the plane elements and determines which sub-pixel shift provides the lowest overall energy. The sub-pixel registration component 104 then outputs the sub-pixel shift and energy information to the super-resolution component 106.

Upon receiving the sub-pixel shift and energy information from the sub-pixel registration component 104, the super-resolution component 106 constructs a super resolution image based on the received image information. The functionality of the components and sub-components shown in FIG. 3B can be performed by one or more processors. Additionally, the components and sub-components shown in FIG. 3B can be implemented in one or more devices that are connected by one or more networks.

The process described in the flow diagram of FIG. 3A and shown in the schematic of FIG. 3B will now be described in more detail. Given that each image, $IM_1$ and $IM_2$, displays a similar scene from a different perspective, the location of one or more particular features or objects (e.g., a tree, car, person, etc.) can vary from the first image to the second image. Accordingly, it is preferable to coarsely align the scenes/features of the two images prior to applying any sub-pixel shift. Such alignment is achieved using pixel level registration (301). In pixel level registration, the pixels in image $IM_2$ are registered/aligned with pixel locations of image $IM_1$ that correspond to the same or nearly the same features found in the captured scene. Examples of pixel level registration algorithms include, but are not limited to: linear transformations, such as translating, rotating, and global scaling; polynomial wrapping; Lucas Kanade optical flow estimation; random sample consensus algorithms (RANSAC); and phase correlation.

Figure 4:
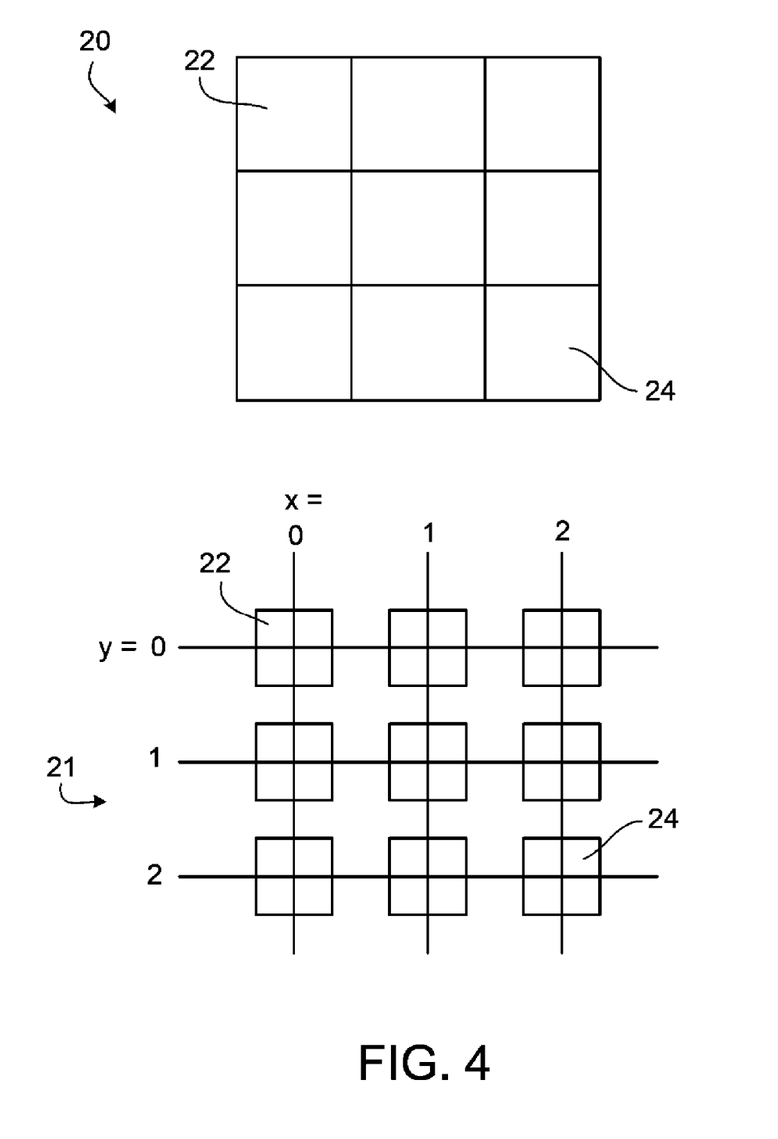
FIG. 4 illustrates an example of matching an image to a coordinate system.

After applying pixel level registration to the images, each image then is matched (303) to a coordinate plane (e.g., a Cartesian plane of x and y coordinates), in which whole integer coordinates of the plane correspond to image pixel locations. For example, FIG. 4 shows that, for an image 20 having three pixels on a side, the image 20 is matched to a grid 21 having the coordinate range, x=0.2 and y=0.2. The top left pixel 22 of the image is matched to coordinate (x=0, y=0).

Likewise, the bottom right pixel 24 of the image is matched to coordinate (x=2, y=2) on the grid 21. The remaining pixels of the image are matched to the coordinate plane accordingly. However, the coordinate plane is not limited to a Cartesian system. The images can be mapped to other coordinate planes including, but not limited to, circular or polar coordinate planes.

A third coordinate, z, then is introduced for each image. The z coordinate represents the pixel value corresponding to a particular channel or color space value of the image. For example, the third coordinate can correspond to the image luminosity, intensity, or alpha value of that particular pixel. Alternatively, or in addition, the third coordinate can correspond to an image color channel such as red, green, blue, cyan, magenta, yellow, black, hue, saturation or lightness of the particular pixel. Other image values may be used as well. As a result, a three-dimensional grid $G_i(x, y, z)$ is formed for each image, in which i=1 for image $IM_1$ and i=2 for image $IM_2$. For 3 or more images, i=1, 2, . . . , N, wherein N is the total number of images.

Referring again to FIG. 3A, once the grids $G_{1,2}$ for each image $IM_{1,2}$ have been obtained, an arbitrary shift along a vector S=(sx, sy) is applied (305) to grid $G_2$ such that grid $G_2$ has new coordinates $G_2^*=G_2(x, y, z)+S$. However, the vector shift S is only along the x-y plane of the grid. That is to say, the image channel/color space value at each pixel does not change. Thus, the z coordinate values for grid $G_2$ at the new positions along the x-y plane remain equal to their value prior to the shift.

Furthermore, the value of the sub-pixel shift can be set as desired. For example, if the image pixels are arranged at integer intervals, then the vector shift can be limited to a distance that is no greater than the distance between pixels, i.e., a sub-pixel shift in which sx, sy<|1|. However, other values for the sub-pixel shifts sx, sy also can be defined. The value of the sub-pixel shift S can be input by a user or can be produced randomly by means of a computer. Grid $G_1$, on the other hand, is not shifted.

Figure 5A:
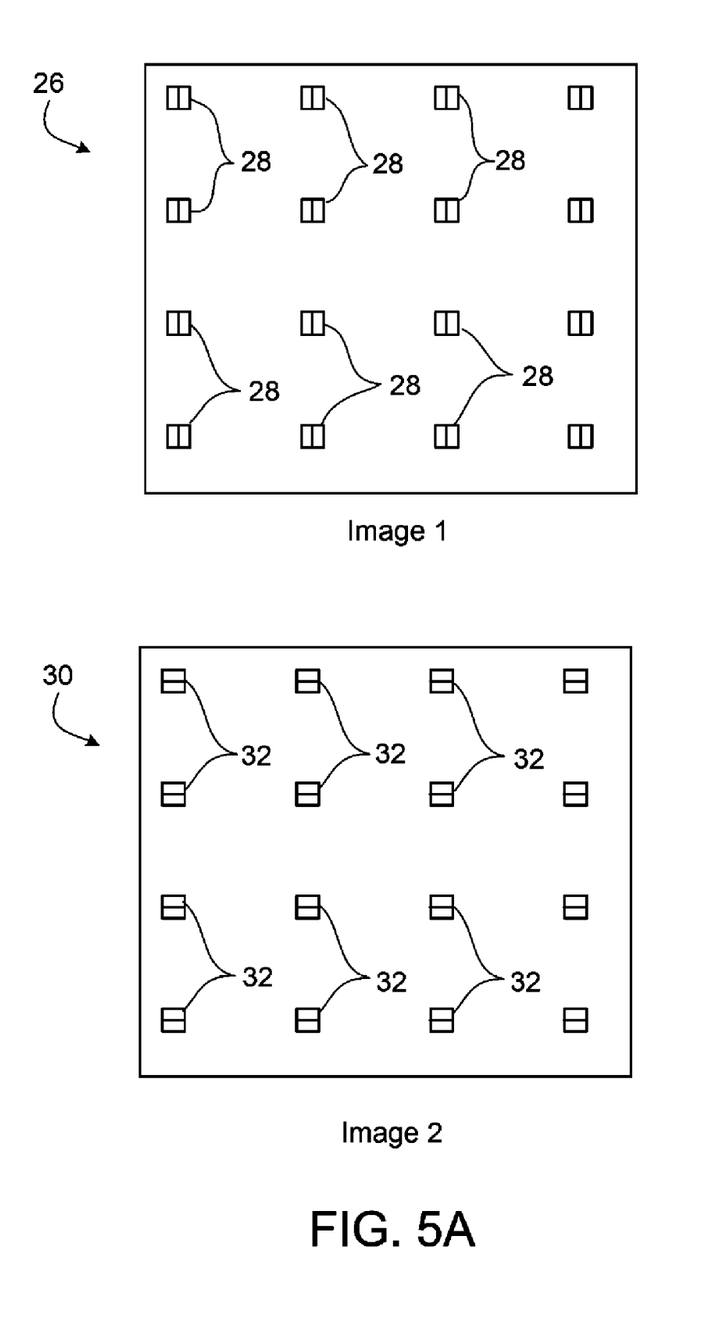
FIGS. 5A-5C illustrate applying pixel and sub-pixel registration to two example images.
Figure 5B:
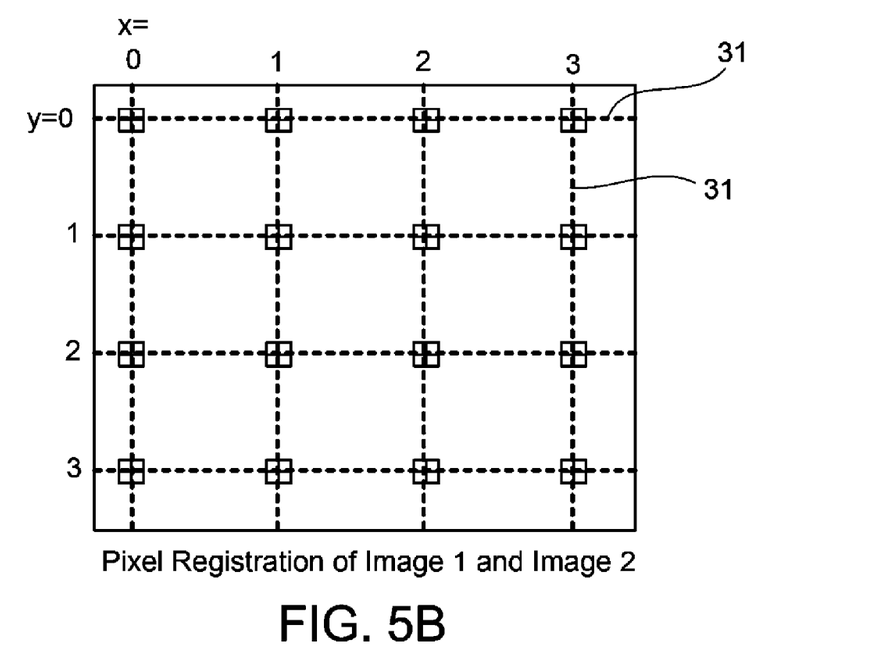
Figure 5C:
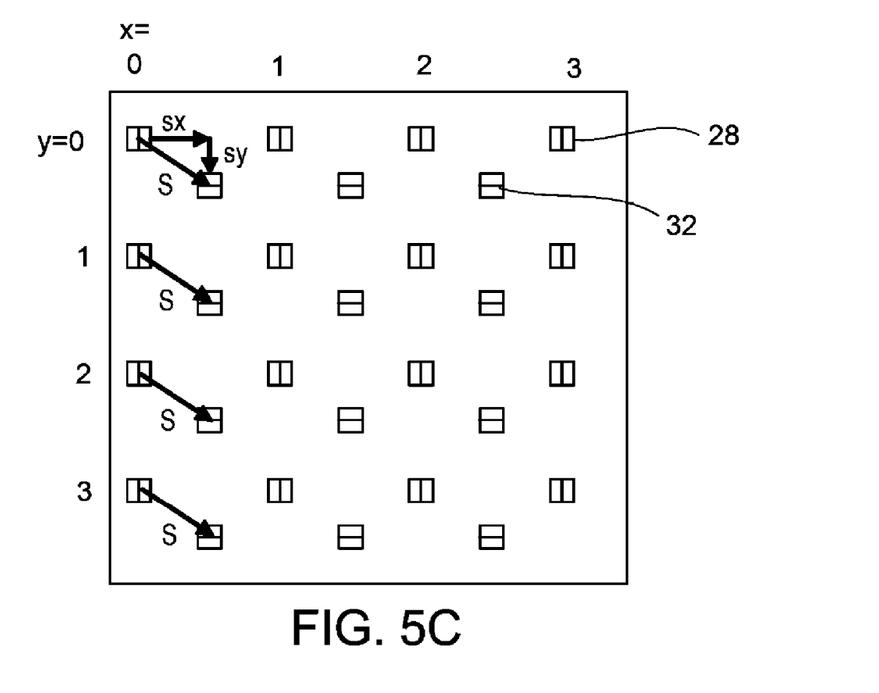

FIGS. 5A-5C show an example of applying pixel and sub-pixel registration to two separate images, 26 and 30. Image 26 is composed of pixels 28 whereas image 30 is composed of pixels 32 (see FIG. 5A). Each image 26, 30 represents a slightly different view of a scene. The horizontal lines in each pixel 28 and the vertical lines in each pixel 32 do not correspond to part of the imaged scene. Instead, these lines are merely used as markers to identify the images to which the pixels belong. As shown in FIG. 5B, a coarse pixel level registration is applied to both image 26 and 30. The registered images 26, 30 then are overlayed on a xy plane (represented by dashed lines 31) to form grids $G_1(x, y, z)$ and $G_2(x, y, z)$. A sub-pixel shift along a vector S then is applied to the pixels 32 of grid $G_2$. The vector S includes a shift in the x-direction (sx) as well as a shift in the y-direction (sy). As shown in FIG. 5C, the sub-pixel shift displaces grid $G_2$ to a new location on the xy plane represented by $G_2(x+sx, y+sy, z)$.

Figure 6A:
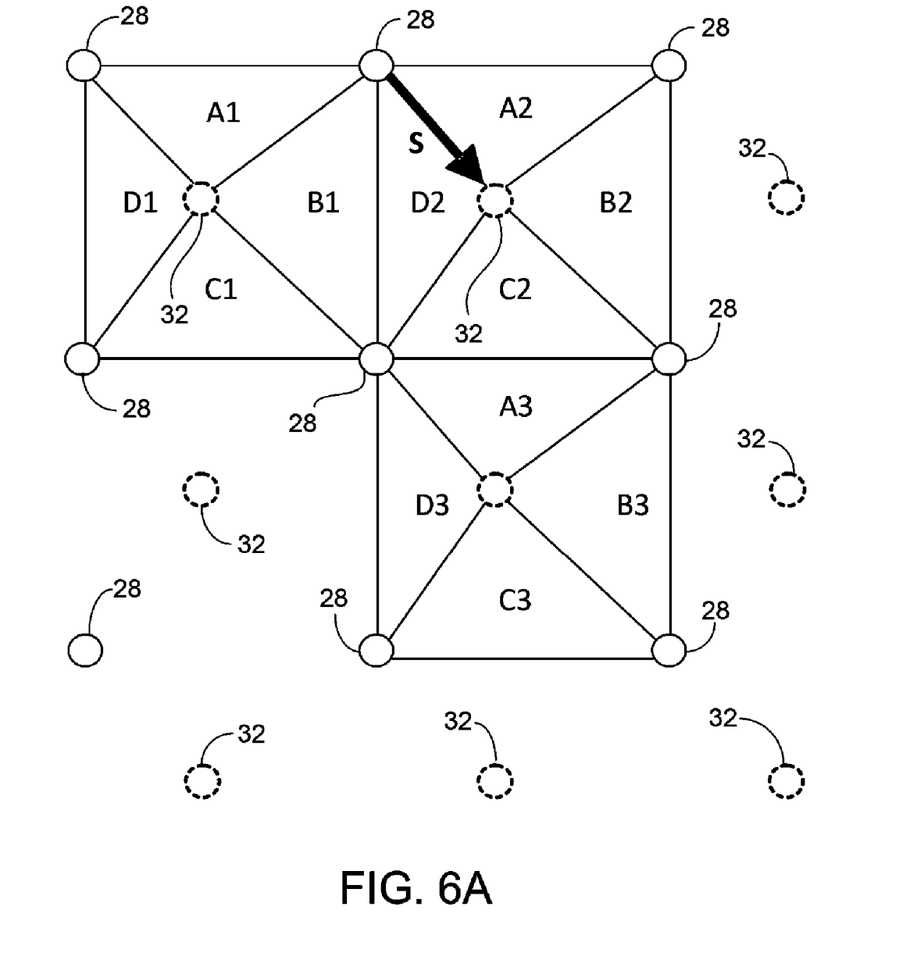
FIG. 6A illustrates examples of image planes formed by connecting adjacent pixels.

Having shifted grid $G_2$, image planes are constructed by connecting adjacent pixels from both grid $G_1$ and grid $G_2$. Examples of image planes formed by connecting adjacent pixels are shown in FIG. 6A. Pixels 32 (dashed line circles in FIG. 6A) correspond to pixels of grid $G_2$ that have been shifted by vector S whereas pixels 28 correspond to the non-shifted pixels of grid $G_1$ (solid line circles in FIG. 6A). In regions where the shifted pixel 32 has four nearest neighbor pixels, four planes (A, B, C and D) are formed around the pixels 32 of grid G2. If a pixel 32 is located near an edge of the coordinate plane such that only two nearest neighbor pixels are available, then only two planes are constructed. In some implementations, only non-boundary pixels are used so as to guarantee that there are four nearest neighbor pixels.

Figure 6B:
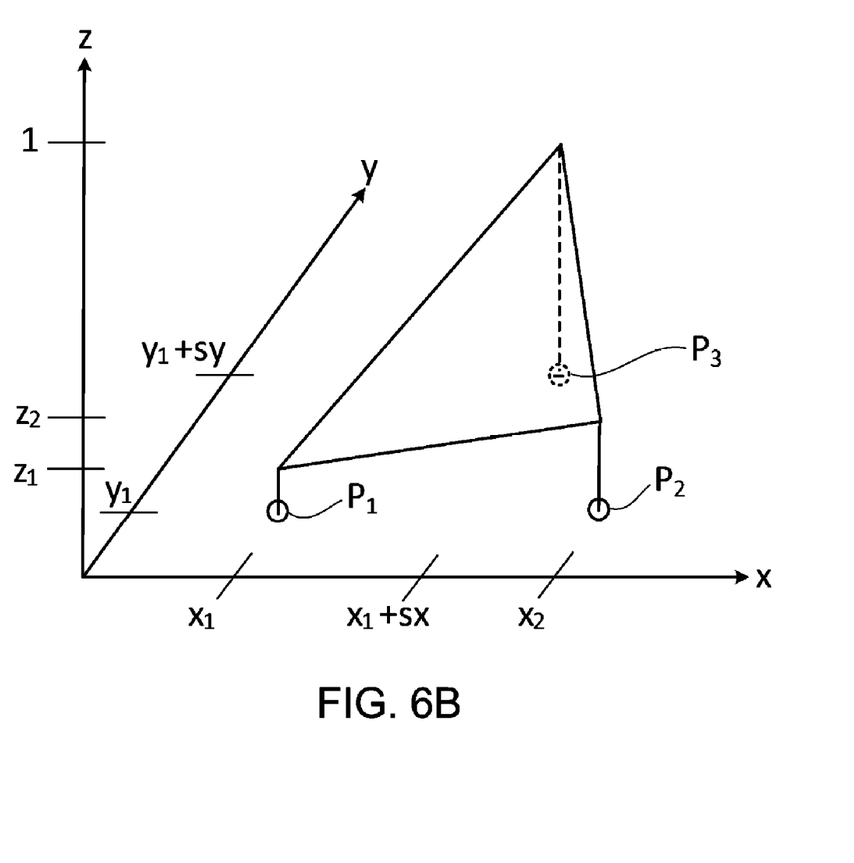
FIG. 6B illustrates an example of a plane constructed from pixels.

Image planes A, B, C and D are three dimensional planes in which the height of the plane at each pixel is given by the pixel z coordinate value. That is to say, the image channel value corresponds to the z-coordinate of the image plane. For example, FIG. 6B shows an example of an image plane 34 constructed from pixels $P_1$, $P_2$ of grid $G_1$ and pixel $P_3$ from grid $G_2$ and is represented in a three dimensional space. If the z coordinate represents a grayscale intensity, then a value of 0 can be equivalent to the color black whereas a value of 1 would be equivalent to the color white. For the example shown in FIG. 6B, each of pixels $P_1$ and $P_2$ have a gray component and thus have z-coordinates between 0 and 1 (e.g., $z_1$, $z_2$). In contrast, the color value of pixel $P_3$ is white so that its grayscale intensity corresponds to a z-coordinate equal to 1. Accordingly, the image plane 34 is formed by a plane that extends through the three non-collinear points $P_1(x_1, y_1, z_1)$, $P_2(x_2, y_1, z_2)$, and $P_3(x_1+sx, y_1+sy, 1)$.

A rationale for shifting grid $G_2$ and constructing image planes is to determine the optimal location of a first image with respect to a second image such that a composite high-resolution image can be constructed from the first and second images. A technique for determining whether the sub-pixel shift places grid $G_2$ in the optimal location is to compute an overall image energy (e.g., $E_1$) for a particular sub-pixel shift (e.g., $S_1$) based on an energy of each of the image planes. That overall image energy E1 then is compared to image energies (e.g., $E_2$, $E_3$, . . . $E_M$) computed for different sub-pixel shift values (e.g., $S_2$, $S_3$, . . . $S_M$) in which M is the total number of sub-pixel shifts applied. The sub-pixel shift S that results in the lowest overall image energy corresponds to the optimal shift of grid $G_2$. To determine the overall image energy for a particular sub-pixel shift, the energy of each plane Ep in the image is calculated for the specified vector shift S. The calculated energy of each plane then is summed over all the constructed planes. Ep is calculated as the sum of the square of the plane gradient in the x-direction (e.g., dz/dx) and the square of the plane gradient in the y-direction (e.g., dz/dy). The values dz/dx and dz/dy correspond, respectively, to the change in the plane height in the x and y directions. Thus, the energy of plane A1 in FIG. 6A is calculated as $EP_{A1}=(dz/dx)^2+(dz/dy)^2$ over the area of plane A1. The energy $Ep_{B1}$, $Ep_{C1}$ and $EP_{D1}$ of planes B1, C1 and D1 are computed in a similar manner. Other techniques for computing the energy due to vector shifts can be used as well. The overall image energy then is calculated as the sum of energy of each plane in the image, i.e., $$E=Ep_A+Ep_B+Ep_C+Ep_D,$$

in which $Ep_A=Ep_{A1}+Ep_{A2}+$ . . . , $Ep_B=Ep_{B1}+Ep_{B2}+$ . . . , $Ep_C=Ep_{C1}+Ep_{C2}+$ . . . , and $Ep_D=Ep_{D1}+Ep_{D2}+$ . . . . As an example, if a shifted grid $G_2$ includes four pixels and there are four planes for each shifted pixel, then the energy of each of the 16 total planes can be added together to produce the overall image energy.

Once the overall image energy E is calculated for a specified vector shift S, the image energy E for the shift S is stored in memory and the process is repeated, i.e., grid $G_2$ is shifted again by S and the overall image energy E is calculated and stored for the subsequent shift. When the image energy has been calculated for each vector shift S within the specified range, the stored energies are compared to determine the location $(x_{min}, y_{min})$ of grid $G_2$ that corresponds to the smallest overall image energy. The values of the grid location that correspond to the minimum energy can be output to the user or saved to memory.

When a minimum energy is found, the process can be further refined to identify a more precise location of where the minimum energy occurs. For example, the values of sx and/or sy can be reduced by a factor of 2, 4, 6, 8 or 10. The values of sx and sy can be reduced by other values as well. In addition, the range over which grid $G_2$ is shifted also can be further limited. For example, the shifting of grid $G_2$ can be limited to a distance of $x<(x_{min}\pm dx)$ and $y<(y_{min}\pm dy)$, in which dx and/or dy are equal to 0.5, 0.25, 0.1, 0.05, 0.025. Other values for dx and dy can be used as well. The foregoing process of identifying the location of grid $G_2$ that corresponds to the minimum energy and further refining the sub-pixel shift can be repeated as desired.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   mapping first pixels from a first image and second pixels from a second image to a coordinate system;
   applying one or more sub-pixel shifts to the mapped first pixels;
   for each sub-pixel shift, calculating an overall energy based on a plurality of gradients that represent changes in a channel value among the shifted first pixels and the mapped second pixels; and
   determining the sub-pixel shift that provides the lowest overall energy.

2. The method of claim 1, further comprising:
   applying pixel-level alignment to the first image and the second image prior to mapping the first pixels and the second pixels to the coordinate system.

3. The method of claim 1 wherein calculating an overall energy comprises:
   determining one or more planes from third pixels comprising a plurality of shifted first pixels and mapped second pixels.

4. The method of claim 3 wherein vertices of the planes are coincident with locations of the third pixels in the coordinate system.

5. The method of claim 1 wherein the channel is one of luminosity, intensity and alpha value.

6. The method of claim 1 wherein the channel corresponds to a dimension in a color space.

7. The method of claim 4 wherein calculating an overall energy further comprises:
   calculating an energy for each plane based on a change in channel value across the plane.

8. The method of claim 7 wherein calculating an energy for each plane comprises:
   calculating a gradient for each plane.

9. The method of claim 7 wherein calculating an overall energy further comprises summing the energy of each plane.

10. The method of claim 1 further comprising:
    refining the one or more sub-pixel shifts;
    applying the refined one or more sub-pixel shifts to the mapped first pixels;
    for each refined sub-pixel shift, calculating a refined overall energy based on a plurality of refined gradients that represent changes in a channel value among the first pixels shifted by the refined sub-pixel shift and the mapped second pixels; and
    determining the refined sub-pixel shift that provides the lowest refined overall energy.

11. A computer program product, encoded on a non-transitory computer-readable medium, operable to cause a data processing apparatus to perform operations comprising:
    mapping first pixels from a first image and second pixels from a second image to a coordinate system;
    applying one or more sub-pixel shifts to the mapped first pixels;
    for each sub-pixel shift, calculating an overall energy based on a plurality of gradients that represent changes in a channel value among the shifted first pixels and the mapped second pixels; and
    determining the sub-pixel shift that provides the lowest overall energy.

12. The computer program product of claim 11 operable to cause the data processing apparatus to perform operations further comprising applying pixel-level alignment to the first image and the second image prior to mapping the first pixels and the second pixels to the coordinate system.

13. The computer program product of claim 11 wherein calculating an overall energy comprises determining one or more planes from third pixels comprising a plurality of shifted first pixels and mapped second pixels.

14. The computer program product of claim 13 wherein vertices of the planes are coincident with locations of the third pixels in the coordinate system.

15. The computer program product of claim 11 wherein the channel is one of luminosity, intensity and alpha value.

16. The computer program product of claim 11 wherein the channel corresponds to a dimension in a color space.

17. The computer program product of claim 14 wherein calculating an overall energy further comprises:
    calculating an energy for each plane based on a change in channel value across the plane.

18. The computer program product of claim 17 wherein calculating an energy for each plane comprises calculating a gradient for each plane.

19. The computer program product of claim 17 wherein calculating an overall energy further comprises summing the energy for each plane.

20. The computer program product of claim 11 operable to cause the data processing apparatus to perform operations further comprising:
    refining the one or more sub-pixel shifts;
    applying the refined one or more sub-pixel shifts to the mapped first pixels;
    for each refined sub-pixel shift, calculating a refined overall energy based on a plurality of refined gradients that represent changes in a channel value among the first pixels shifted by the refined sub-pixel shift and the mapped second pixels; and
    determining the refined sub-pixel shift that provides the lowest refined overall energy.

21. A system comprising:
    a user interface device; and
    one or more computers operable to interact with the user interface device and to perform operations comprising:
    mapping first pixels from a first image and second pixels from a second image to a coordinate system;
    applying one or more sub-pixel shifts to the mapped first pixels;
    for each sub-pixel shift, calculating an overall energy based on a plurality of gradients that represent changes in a channel value among the shifted first pixels and the mapped second pixels; and
    determining the sub-pixel shift that provides the lowest overall energy.

22. The system according to claim 21 wherein the one or more computers are operable to perform operations further comprising applying pixel-level alignment to the first image and the second image prior to mapping the first pixels and the second pixels to the coordinate system.

23. The system according to claim 21 wherein calculating an overall energy comprises determining one or more planes from third pixels comprising a plurality of shifted first pixels and mapped second pixels.

24. The system according to claim 23 wherein vertices of the planes are coincident with locations of the third pixels in the coordinate system.

25. The system according to claim 21 wherein the channel is one of luminosity, intensity and alpha value.

26. The system according to claim 21 wherein the channel corresponds to a dimension in a color space.

27. The system according to claim 24 wherein calculating an overall energy further comprises:
    calculating an energy for each plane based on a change in channel value across the plane.

28. The system according to claim 27 wherein calculating the energy for each plane comprises calculating a gradient for each plane.

29. The system according to claim 27 wherein calculating the overall energy further comprises summing the energy for each plane.

30. The system according to claim 21 wherein the one or more computers are operable to perform operations further comprising:

refining the one or more sub-pixel shifts;

applying the refined one or more sub-pixel shifts to the mapped first pixels;

for each refined sub-pixel shift, calculating a refined overall energy based on a plurality of refined gradients that represent changes in a channel value among the first pixels shifted by the refined sub-pixel shift and the mapped second pixels; and determining the refined sub-pixel shift that provides the lowest refined overall energy.

* * * * *